United States Patent [19]

Stevens

[11] 4,282,704
[45] Aug. 11, 1981

[54] FILAMENT TRIMMER MOWER WITH FOLDING SHIELD

[75] Inventor: Myron T. Stevens, Kenosha, Wis.

[73] Assignee: Outboard Marine Corporation, Waukegan, Ill.

[21] Appl. No.: 152,835

[22] Filed: May 23, 1980

[51] Int. Cl.³ .................... A01D 67/00; A01D 75/20
[52] U.S. Cl. ................................. 56/320.1; 56/17.4; 56/255
[58] Field of Search .............. 56/320.1, 320.2, 255, 56/17.4, DIG. 20, 12.7; 30/276, 286

[56] References Cited

U.S. PATENT DOCUMENTS

| | | | |
|---|---|---|---|
| 2,511,124 | 6/1950 | Phelps | 56/DIG. 20 |
| 2,578,880 | 12/1951 | Doyle | 56/255 |
| 2,618,920 | 11/1952 | Cocklin | 56/255 |
| 3,797,213 | 3/1974 | Sadow, Jr. et al. | 56/320.1 |
| 4,033,098 | 7/1977 | Green | 56/17.5 |
| 4,077,191 | 3/1978 | Pittingier, Sr. | 56/12.7 |
| 4,137,694 | 2/1979 | Hopper | 56/12.7 |

Primary Examiner—Paul J. Hirsch
Attorney, Agent, or Firm—Michael, Best & Friedrich

[57] ABSTRACT

Disclosed herein is a filament mower comprising a housing having a main portion with a depending wall and a housing extension movable between a generally horizontally outwardly extending guard position and a retracted position, which extension includes a first segment hinged to the housing main portion about a first axis extending transversely to the direction of intended mower movement for upward movement from the guard position, and a second segment hinged to the first segment about a second axis spaced from the first axis and extending transversely to the direction of intended mower movement for movement about the second axis in the rotary direction opposite to the direction of rotary movement of the first segment about the first axis. The mower also includes resilient means biasing the housing extension toward the guard position, a plurality of wheels supporting the housing, a filament head carried by and within the housing and including a filament string, and means on the housing for rotating the head.

10 Claims, 3 Drawing Figures

FILAMENT TRIMMER MOWER WITH FOLDING SHIELD

BACKGROUND OF THE INVENTION

The invention relates to filament string cutting of grass and other vegetation and, more particularly, to filament string mowers.

One example of a prior filament string cutter supported on a wheel is disclosed in U.S. Green Pat. No. 4,033,098 issued July 5, 1977.

One example of a prior filament string mower is disclosed in the U.S. Pittinger Pat. No. 4,077,191 issued Mar. 7, 1978.

Another wheel supported filament cutter is disclosed in the U.S. Hooper Pat. No. 4,137,694 issued Feb. 6, 1979.

SUMMARY OF THE INVENTION

The invention provides a filament mower comprising a housing having a main portion with a depending wall and a housing extension movable between a generally horizontally outwardly extending guard position and a retracted position, which extension includes a first segment hinged to said housing main portion about a first axis extending transversely to the direction of intended mower movement from the guard position, and a second segment hinged to the first segment about a second axis spaced from the first axis and extending transversely to the direction of intended mower movement for movement about the second axis in the rotary direction opposite to the direction of rotary movement of the first segment about the first axis. The mower also includes resilient means biasing the housing extension toward the guard position, a plurality of wheels supporting the housing, a filament head carried by and within the housing and including a filament string, and means on the housing for rotating the head.

Other features and advantages of the embodiments of the invention will become known by reference to the following general description, claims and appended drawings.

IN THE DRAWINGS

Figure 1:
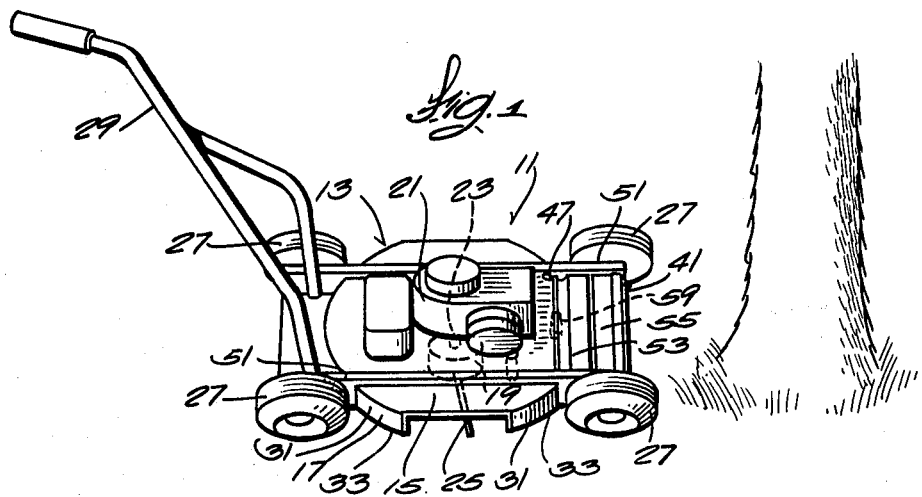
FIG. 1 is a perspective view of a filament mower including various of the features of the invention.

Before explaining at least one embodiment of the invention in detail, it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in the drawings is a filament mower 11 which incorporates various of the features of the invention and which includes a housing 13 having a main portion 15 with a depending wall 17 defining the housing interior and enclosing a rotary head 19 supported by the housng 13. Mounted on the top of the housing 13 is a prime mover 21, such as an electric motor or an internal combustion engine, including an output shaft 23 which is connected to the head 19. The head 19 carries a length of filament string 25 and serves to rotate the string 25 in response to head rotation and to controllably play out the string 25 in response to a suitable mechanism (not shown). The housing 13 is supported for travel over the ground by a plurality of wheels 27 which are preferably height-adjustable and is guided for travel over the ground by a handle 29 mounted on the housing 13.

Various housing constructions can be employed. In the illustrated construction, the depending wall 17 includes a plurality of portions 31 which, preferably, are arcuate, and which extend at a generally common distance or radius from the axis of head rotation greater than the effective radial length of the filament string 25 when rotating, and which include lower edges 33 located below the plane of rotation of the filament string 25. At its forward end, the depending wall 17 includes a transverse portion 35 having a lower edge 37 which is located above the plane of rotation of the trimmer string 25. The transverse wall 35 is located, at least in part, at a radial distance from the center of head rotation less than the common radius of the wall portions 31 and less than the effective radial length of the filament string 25 when rotating.

Mounted on the main portion 15 of the housing 13 for forward projection therefrom is a housing extension 41 which is movable between a forwardly projecting, generally horizontal, guard position (see FIG. 2) extending over the forward portion of the path of travel of the outer edge of the filament string 25 and a rearwardly retracted portion (see FIG. 3) located inwardly of the outer edge of the forward portion of the path of travel of the outer end of the filament string 25. The extension 41 is hingedly mounted to the housing 13 about an axis transverse to the intended direction of mower travel. Various arrangements can be employed for hingedly mounting the extension 41 to the front of the housing 13. In the illustrated construction, such means comprises a hinge pin 43 which extends through a cross bore 45 in the extension 41 and which is supported by suitable brackets 47 mounted on the housing 13. Axial movement of the hinge pin 43 is prevented by interference of the ends thereof with laterally spaced housing portions 51 which extend forwardly of the housing main portion 15.

The extension 41 comprises first or rearward and second or forward segments, respectively 53 and 55, which are preferably fabricated as a unitary piece including an area of design weakness and small cross section which provides a transverse axis 57 affording relative rotary movement between the first and second segments 53 and 55. The cross bore 45 is located in the first segment 53.

Figure 2:
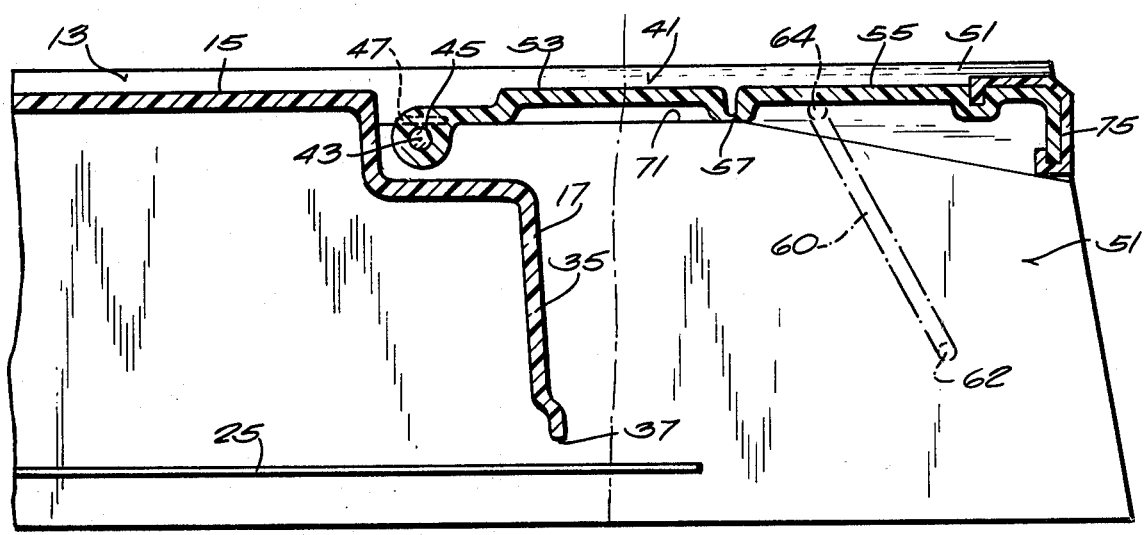
FIG. 2 is an enlarged fragmentary view, partially in section of a portion of the mower shown in FIG. 1 and illustrating the foldable extension in the guard position.
Figure 3:
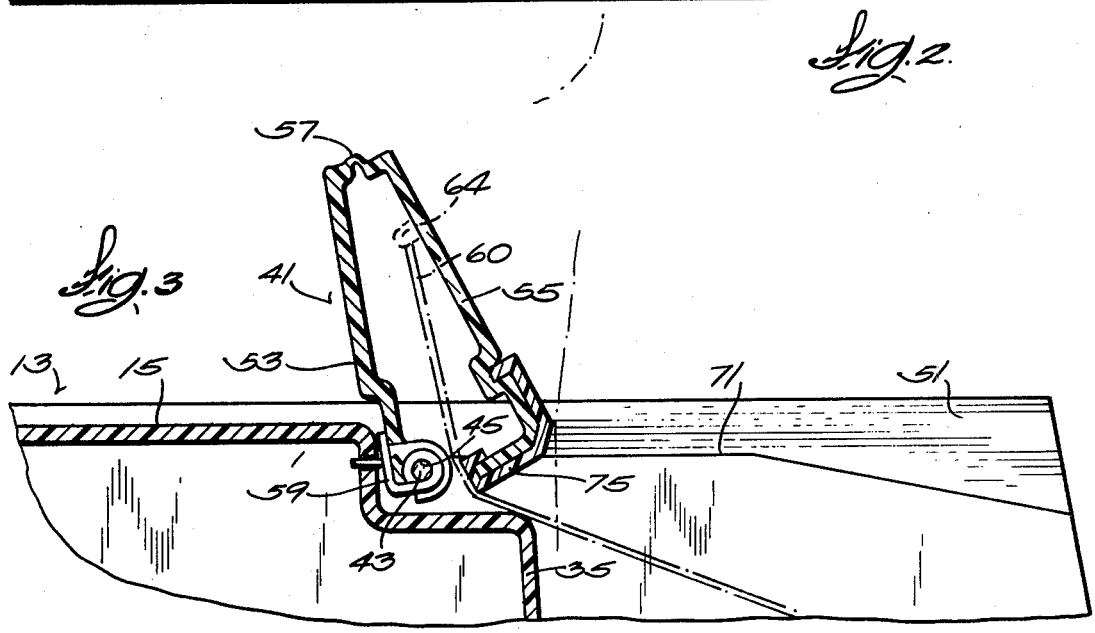
FIG. 3 is a view similar to FIG. 2 illustrating the foldable extension in the retracted position.

Means are provided for biasing the extension 41 toward its forwardly extending guard position shown in FIG. 2. While various arrangements can be employed, in the illustrated construction, such means comprises a torsion spring 59 which encircles the hinge pin 43 and which includes opposite end portions, one of which bears against the housing 13 and the other of which bears against the extension 41 so as to yieldably bias the extension 41 for rotary movement in the clockwise direction as seen in FIGS. 2 and 3 toward the guard position.

Other constructions could also be used for yieldably biasing the extension 41 toward the guard position. For instance, a yieldably extendable member 60 could be connected between an anchor 62 fixed with respect to the housing 13 and an anchor 64 fixed with respect to the second segment 55.

Means are provided for limiting movement of the extension 41 toward the guard position and so as thereby also to support the extension in the guard position. While other arrangements can be employed, in the illustrated construction, the laterally spaced forwardly extending portions 51 of the housing each include a surface or shelf 71 which is engaged by both extension segments 53 and 55 when the extension is in the guard position.

Preferably, the extension 41 includes, at its forward end, a bumper 75 designed with a portion thereof which extends, when the extension 41 is in the guard position, below the level of the hinge pin axis and the axis 57 and in position for abutment with an interferring obstacle in the path of the extension 41.

Such abutment causes rearward and upward movement of both extension segments 53 and 55, the rearward or first segment 53 pivoting about the hinge pin 43 in the counterclockwise direction as shown in FIGS. 2 and 3 against the action of the spring 59 to the retracted position shown in FIG. 3 and the second segment 55 pivoting relative to the first segment 53 about the axis 57 in the opposite rotary direction to the retracted position located above and rearwardly of the guard position. The arrangement is such that when the extension 41 is in the retracted position, the outer end of the filament string 25 extends radially beyond the retracted position and beyond the depending wall portion so as to cut vegetation located between the forwardly extending housing portions 51.

Thus the disclosed invention permits straddling of an obstacle, such as a tree, post, or the like, together with movement of the extension 41 to the rearward position from the guard position in response to engagement with the obstacle, thereby permitting cutting of vegetation in the immediate area of the obstacle and in front of the mower, while otherwise providing for location of the extension 41 in the forwardly located guard position.

Various of the features of the invention are set forth in the following claims.

I claim:

1. A filament mower comprising a housing having a main portion including a depending wall and a housing extension movable between a generally horizontally outwardly extending guard position and a retracted position, said extension including a first segment hinged to said housing main portion about a first axis extending transversely to the direction of intended mower movement for upward movement from said guard position, and a second segment hinged to said first segment about a second axis spaced from said first axis and extending transversely to the direction of intended mower movement for movement about said second axis in the rotary direction opposite to the direction of rotary movement of said first segment about said first axis, resilient means biasing said housing extension toward said guard position, a plurality of wheels supporting said housing, a filament head carried by and within said housing and including a filament string, and means on said housing for rotating said head.

2. A filament mower in accordance with claim 1 wherein said resilient means extends between an anchor fixed with respect to said housing and an anchor on said second segment.

3. A filament mower in accordance with claim 1 wherein said housing extension projects forwardly in said guard position from said housing and moves rearwardly from said guard position to said retracted position.

4. A filament mower in accordance with claim 1 wherein said second housing segment includes a bumper having a portion adapted for engagement with an obstacle at a level below said first and second axis.

5. A filament mower in accordance with claim 1 wherein said housing includes means engageable with said housing extension for limiting pivotable extension movement in the direction toward said guard position and for supporting said housing extension in said guard positon.

6. A filament mower in accordance with claim 5 wherein said housing includes means engageable with said first segment so as to prevent further pivotable movement thereof beyond said guard position and thereby to support said first segment in said guard position.

7. A filament mower in accordance with claim 5 wherein said housing includes means engageable with said second segment so as to prevent further pivotable movement thereof beyond said guard position and thereby to support said second segment in said guard position.

8. A filament mower in accordance with claim 1 wherein said filament string normally has an effective length such that said string extends radially outwardly, during rotation of said head, in the area of said extension and beyond said extension when said extension is in said retracted position.

9. A filament mower in accordance with claim 1 wherein said depending wall includes a plurality of portions having a common radius from the center of rotation of said head and a segment located adjacent said extension at a radial distance less than said common radius, and wherein said string normally has an effective length when rotating less than the common radius and greater than said radial distance.

10. A filament mower in accordance with claim 9 wherein said first axis is located at a radial distance from the center of rotation of said head at a second radial distance less than said radial distance to said depending wall segment.

* * * * *